(12) United States Patent
Casper et al.

(10) Patent No.: US 7,774,519 B2
(45) Date of Patent: *Aug. 10, 2010

(54) CHANNEL COMMUNICATION ARRAY QUEUES IN HARDWARE SYSTEM AREA

(75) Inventors: Daniel F. Casper, Poughkeepsie, NY (US); John R. Flanagan, Poughkeepsie, NY (US); Paul S. Frazer, Poughkeepsie, NY (US); Kenneth J. Oakes, Wappingers Falls, NY (US); John S. Trotter, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/167,298

(22) Filed: Jul. 3, 2008

(65) Prior Publication Data
US 2009/0037618 A1 Feb. 5, 2009

Related U.S. Application Data

(63) Continuation of application No. 11/139,728, filed on May 27, 2005, now Pat. No. 7,437,490.

(51) Int. Cl.
*G06F 3/00* (2006.01)
*G06F 13/12* (2006.01)
(52) U.S. Cl. .................. 710/36; 710/2; 710/8; 710/62; 710/72
(58) Field of Classification Search ............... None
See application file for complete search history.

(56) References Cited

U.S. PATENT DOCUMENTS

| 4,604,709 | A | 8/1986 | Blount et al. |
|---|---|---|---|
| 4,633,387 | A | 12/1986 | Hartung et al. |
| 5,247,638 | A | 9/1993 | O'Brien et al. |
| 5,325,488 | A | 6/1994 | Carteau et al. |
| 5,526,482 | A | 6/1996 | Stallmo et al. |
| 5,542,638 | A | 8/1996 | Smith |
| 5,548,791 | A | 8/1996 | Casper et al. |
| 6,466,993 | B1 | 10/2002 | Bonola |
| 7,243,166 | B2 | 7/2007 | Inoue |
| 2002/0083249 | A1 | 6/2002 | Brown et al. |
| 2003/0065871 | A1 | 4/2003 | Casper et al. |

OTHER PUBLICATIONS zSeries Principle of Operations, IBM Corporation, May 2004, Fourth Edition, SA22-7832-03.

*Primary Examiner*—Alan Chen
(74) *Attorney, Agent, or Firm*—Steven Chiu

(57) ABSTRACT

A bi-directional and full duplex facility for permitting both the IO processor and the Channel to write CCA messages on their respective queues at the same time. IOP messages to the channel are stored on the TO_CHN queue and Channel messages to the IOP on the TO_IOP queue. CCA Queues replace hardware CCAs due to increasing transmission capabilities of current IO processors and Channel processors. Even though the mechanism is similar, the present invention provides some benefits in the use of signaling. The IOP does not have to signal the Channel each time it puts something on its outbound queue. Each queue contains multiple slots. This allows the IOP and Channel to write multiple messages on the targeted queue without encountering a CCA busy signal. The actual queues are now structured in hardware system memory.

2 Claims, 2 Drawing Sheets

CHANNEL COMMUNICATION ARRAY QUEUES IN HARDWARE SYSTEM AREA

CROSS REFERENCE TO RELATED PATENT AND PATENT APPLICATION

U.S. Pat. No. 4,604,709, entitled "Channel Communicator", is assigned to the same assignee hereof and contains subject matter related, in certain respect, to the subject matter of the present application. This application is a continuation of U.S. patent application Ser. No. 11/139,728 "CHANNEL COMMUNICATION ARRAY QUEUES IN HARDWARE SYSTEM AREA" filed May 27, 2005, now U.S. Pat. No. 7,437,490, the contents of which are incorporated by reference herein in its entirety.

FIELD OF THE INVENTION

This invention relates generally to a data processing apparatus and more specifically to components of the channel subsystem of a data processing system.

BACKGROUND OF THE INVENTION

A channel subsystem (CSS) is a conventional part of a data processing system and is well known in the art of data processing systems. A CSS directs the flow of information between I/O devices and main storage and is mainly comprised of one or more I/O processors (IOPs) and I/O channel paths (channels) with some participation of the central processors (CPs). IOPs are also synonymously referred to as SAPs (system assist processors). In a simple system, I/O instructions are initiated by a CP that might execute a sequence of instructions that partly use only the resources of the CP and that partly directly control the resources and the operations of the CSS. In a CSS of the type that will use this invention, IOPs perform a portion of an I/O operation, and one or more channels handle other parts of the I/O operation. The IOPs determine which channel to select for an I/O operation. The channels handle the actual data transfers into and out of processor memory and they execute commands by forming orders that are sent to the I/O device controllers. The IOP also handles general parts of the I/O operation such as communicating with the CPs through interfaces such as control blocks in reserved memory called hardware system area (HSA), scheduling the I/O operations, and reporting status conditions to a CP. A single IOP can handle requests from multiple CPs and report status to different CPs.

The IOPs and the channels also communicate with each other, and the present invention provides an improvement in these communications. The IOP signals a particular channel when an I/O operation is to be performed and the channel signals the IOP when the operation has been completed and whenever some other general operation is to be performed by the IOP. In the known prior art, these communications are carried out over signal wires that run between the IOP and the channels or over the existing data paths that connect the IOP and the channels.

In IBM mainframe systems from the 3090 to the z990, an integral part of the communication mechanism used in the Channel Subsystem (CSS) between the I/O Processors (IOPs) and the Channels for signaling and passing messages to each other is a hardware array called the Channel Communication Array (CCA) as illustrated in FIG. 1. Messages directed to the channel (TO_CHN) typically contain commands to instruct the Channel to perform the necessary steps to initiate I/O operations, such as Start Subchannels (SSCH) to I/O devices. Messages directed to an IOP typically contain the status of these I/O operations as well as unsolicited status from devices connected to the channel. The SSCH instruction and the resulting status is described in the *zSeries Principle of Operations, IBM Corporation, May* 2004, *Fourth Edition*, SA22-7832-03.

There is one eight byte CCA slot ("CCA") for each prior art Channel as shown in FIG. 1. It is bidirectional, but half-duplex in nature. It can only contain a message from either the Channel directed to the IOP (TO_IOP CCA) or from the IOP directed to the Channel (TO_CHN CCA). There may be hundreds or thousands of channels in a large mainframe system. The mechanism provides a set of command primitives the IOPs and Channels use to write, read and reset the CCA. To provide serialization and to avoid overwriting a CCA message that has not been processed yet, the mechanism provides for a "compare and swap like" form of write CCA called a "Conditional Write CCA". When the CMD/STATUS byte of the CCA is nonzero, a "Conditional Write CCA" will return a "CCA Busy" response to the sender who attempted to issue the "Conditional Write CCA". If there is an unprocessed TO_IOP or TO_CHN message sitting in the CCA, this Conditional Write primitive returns a "CCA busy" response to the sender rather than allowing the new message to overwrite the unprocessed message in the CCA. To read this message and free up the CCA, the sender who received the "CCA Busy" message will issue a "Read and Reset CCA". The Reset portion of the command primitive will zero out the CMD/STATUS byte thereby giving the sender another opportunity to reissue the "Conditional Write CCA".

There is also a signaling mechanism to give initiative to the receiver of the CCA message, when it's successfully sent with the "Conditional Write CCA" command, to process the contents of this CCA message. The IOP, as a sender of a CCA message, can signal a specified channel to process the CCA via the Tap Channel primitive. And a Channel, as a sender, can signal an unspecified IOP to process the CCA via setting that channels interrupt vector (IV) bit using the Set IV primitive.

Table A shows a typical format of a TO_CHN or TO_IOP CCA Message 8 byte message:

TABLE A

Format of the 8 byte CCA Message

| 0 1 2 3 4 5 6 7 | 8 | 16 | 24 | 31 |
|---|---|---|---|---|
| D | | | CCA Command Code | |
| Subchannel Identifier | | | | |

As an example, when the IOP needs to process a SSCH instruction that was issued by a program running on a CP, as part of that processing, the IOP will need to send a CCA message to a selected channel to process the SSCH for the subchannel (SCB) specified by the program. Note that an SCB is a control block in HSA that contains the controls for managing an I/O operation for a specific device.

The IOP would set up a TO_CHN message as follows: The D bit (Direction Bit) would be set to '0' indicating that this message was a TO_CHN message. The CCA Command Code would be set to '01' to indicate to the channel that this is a "SSCH Initiative CCA Message". And the Subchannel Identifier would contain addressing information pointing to the specific SCB in HSA describing the device that this SSCH is targeted to. The IOP would then issue a "Conditional Write CCA and Tap Channel" to send the TO_CHN message.

Continuing with this example, the channel hardware would interrupt the channel as the result of the Tap Channel which would cause the channel to issue a Read and Reset CCA. Upon receipt of "SSCH Initiative CCA Message", the channel would verify that this message is a TO_CHN message by reading the Direction bit in the CCA Message. It would then examine the CCA Command Code in the message and recognize it to be a "SSCH Initiative CCA Message". It would then process the SSCH. Upon completion of the SSCH, device status will need to be presented to the program.

Upon receipt of ending device status such as channel end, the channel will present this status to the IOP in the SCB. To let the IOP know that it has ending status to present and in which subchannel the status is, the channel will build a TO_CHN message containing: the D bit set to 1 indicating a TO_IOP message, the CCA Command Code set to '80'x to indicate "SCB Work Pending message", and the Subchannel Identifier will contain addressing information pointing to the specific SCB in HSA containing the ending device status. The channel would then issue a "Conditional Write CCA and Set IV bit to send the TO_IOP message and signal the IOP.

Continuing with this example, the IOP hardware would interrupt the IOP as the result of the Set IV which would cause the IOP to issue a Read and Reset CCA. Upon receipt of "SCB Work Pending message", the IOP would verify that this message is a TO_IOP message by reading the Direction bit in the CCA Message. It would then examine the CCA Command Code in the message and recognize it to be a "SCB Work Pending message". It would then examine the SCB in HSA addressed by the Subchannel Identifier and present the status of the SSCH to the CP.

At system initialization time, each channel is assigned to one of several IOPs. It is this IOP that will service that channel's CCA and IV bit as well as be the only IOP to write the CCAs and Tap its channel. The channel is said to have "affinity" to that IOP. Note that an IOP can service multiple channels.

As the IOPs and channels have become faster and faster and more efficient at managing multiple concurrent operations, the single message, half-duplex nature of the CCA has become a bottleneck in achieving the desired I/O rates For a FICON channel, it is anticipated that the CCA usage could possibly be 10 to 40 times the rate as it is for an ESCON channel. (FICON stands for Fibre Connection Channel which is an IBM adaptation of the Fibre Channel Standard. ESCON stands for Enterprise System Connection Channel, and is otherwise known as a "serial" channel.) The ratio of CCA Busy responses to the actually successful CCA writes is increasing to the point of diminishing returns. To add to the performance degradation, as mainframes become bigger and more nodal in design—whereby groups of CPs, IOPs and CCA arrays are located on different physical "books", the path length from IOPs on one book to the CCAs on another book has increased thereby increasing access time to the CCA.

With increased market pressures to use more common, industry standard hardware, the motivation to incrementally improve the existing CCA hardware has waned. Having a solution that uses more industry standard hardware increases the connectivity options available. With these goals and objectives, a new and innovative solution that makes use of commonly available hardware is needed.

BRIEF SUMMARY OF THE INVENTION

In order to achieve higher Start Subchannel (SSCH) I/O instruction rates on mainframe systems, the present invention is proposed to replace the existing CCA hardware slots for high performance IOP/Channel communications. The present invention provides each Channel with a separate "To Channel" (TO_CHN) queue and a "To IOP" (TO_IOP) queue in hardware system area (HSA) as shown in FIG. 2. HSA is typically common system memory which may have limitations imposed as to its accessibility but this restriction need not be imposed for using the invention. Having separate queues each with multiple slots allows both the IOP and Channel to send each other multiple messages without having to service or reset the CCA messages sent to their inbound queue.

The number of slots in the TO_CHN queue is optimized to allow the channel to Fetch multiple messages in one storage operation and indicate to the IOP that it has fetched all the messages currently pending in the queue (using the prior Test and Set instruction). The number of slots in the TO_IOP queue can be as big as needed since the channel and IOP process each CCA slot individually. For performance reasons, the recommended TO_CHN queue size is the maximum line size that can be processed by a Test and Set instruction. This allows the entire TO_CHN queue to be locked and fetched by the channel in one atomic Test and Set memory operation. This embodiment also presents an alternative method for having a large TO_CHN queue structure which can be locked and fetched by the channel in multiple memory accesses. The TO_IOP queue, on the other hand, can be as many slots as needed since the channel and IOP processes each slot individually. This embodiment presents these alternatives. And depending on the application, the benefits of one queue structure may be more attractive than another.

The invention also emulates in firmware the same set of command primitives that the (prior art) hardware CCA provides for the IOPs and Channels to write, read and reset the TO_CHN or TO_IOP CCA Queues. With the benefits of CCA Queuing, the behavior of the queues is a lot less constrictive as compared to the one slot hardware CCA. For example, there could be multiple TO_IOP and TO_CHN CCA messages in the queues at the same time, unlike with the hardware CCA, which requires some code changes to the firmware in managing these queues. Another improvement is that application firmware will see less "CCA Busy" responses. With this invention, "CCA Busy" will be surfaced to the firmware application when the queue attempted to be written via a "Conditional Write CCA" is full with multiple messages rather than with just one message. In the prior art, CCA Busy was passed back by the hardware to the issuer of a "Conditional Write CCA" when the CCA Command Code was non-zero which meant that the prior CCA command was not processed. This provides another performance improvement.

The signaling mechanism to give initiative to the receiver of the CCA to process the contents of the CCA queue in HSA is similar to that of the hardware CCA. The current best embodiment for CCA Queues is to reuse the signaling hardware that is used for the hardware CCA. The IOP can signal or give initiative to a specified channel to process the TO_CHN CCA queue via a SIG-A primitive which is a form of the Tap Channel primitive. And a Channel can signal or give initiative to an unspecified IOP to process the TO_IOP CCA queue via setting that channels interrupt vector (IV) bit using the same Set IV primitive as the hardware CCA.

The present invention provides some benefits in the use of the signaling. For the TO_CHN queue, the IOP does not have to issue the SIG-A each time it puts something on the to TO_CHN Queue. It only has to SIG-A the Channel when the queue goes from Empty to Not Empty. This is because as the IOP is filling the TO_CHN queue with CCA messages, the IOP can detect when the channel has fetched the prior messages on the queue by observing the TO_CHN queue lock. As will be described in the detailed description below, when the channel processes the queue with a Test and Set to atomically lock the queue and fetch the entire queue contents, the lock byte is set to a FF. The IOP, upon seeing this special lock byte, will clear the queue contents, and then is able to write the TO_CHN CCA in the now open first slot in the queue and issue a SIG-A to give initiative to the channel to fetch the queue. Should the IOP have more TO-CHN messages to put on the queue before the lock has transitioned to FF, the IOP knows that the channel has not processed the queue yet and it can add messages without issuing a redundant SIG-A. Not having to signal the channel every time is a performance benefit since signaling holds up the IOP for some cycles.

Thus, an object of the present invention is to provide a bi-directional and full duplex facility for permitting both the IOP and the Channel to write CCA messages on the respective queues at the same time. IOP messages to the channel are stored on the TO_CHN queue and Channel messages to the IOP on the TO_IOP queue.

Another object of the invention is to minimize "CCA busy" responses. Each Queue contains multiple slots. This allows the IOP and Channel to write multiple messages on the targeted queue without getting a CCA busy and without having the recipient drain the queue every time the sender puts something on it.

Another object of the inventions is to reduce the amount of specialized hardware. The actual queue slots are now structured in HSA, which is system memory. Signaling hardware is required only (SIG-A and Set IV) to avoid the necessity of polling the queue. This embodiment reuses the signaling hardware for the prior art hardware CCA. This also allows greater flexibility for mixing and matching hardware platforms to use the FICON adaptors that have implemented this invention.

Another object of the invention is to reduce signaling requirements. For example, only when TO_CHN queue goes from empty to not empty is a SIG-A required.

Yet another object of the invention is to minimize impact to existing firmware applications for the hardware version of CCA. Since the existing hardware CCA primitives are emulated by firmware managing the present CCA Queues, the changes to firmware is minimized.

Another object of the invention is to permit multiple IOPs to access the CCA Queues for a Channel. Because the CCA Queues are in HSA, which is accessible to any IOP, this makes it easier to allow more than one IOP to access the CCA queues.

BRIEF DESCRIPTION OF THE SEVERAL VIEWS OF THE DRAWING(S

DETAILED DESCRIPTION OF THE INVENTION

Figure 1:
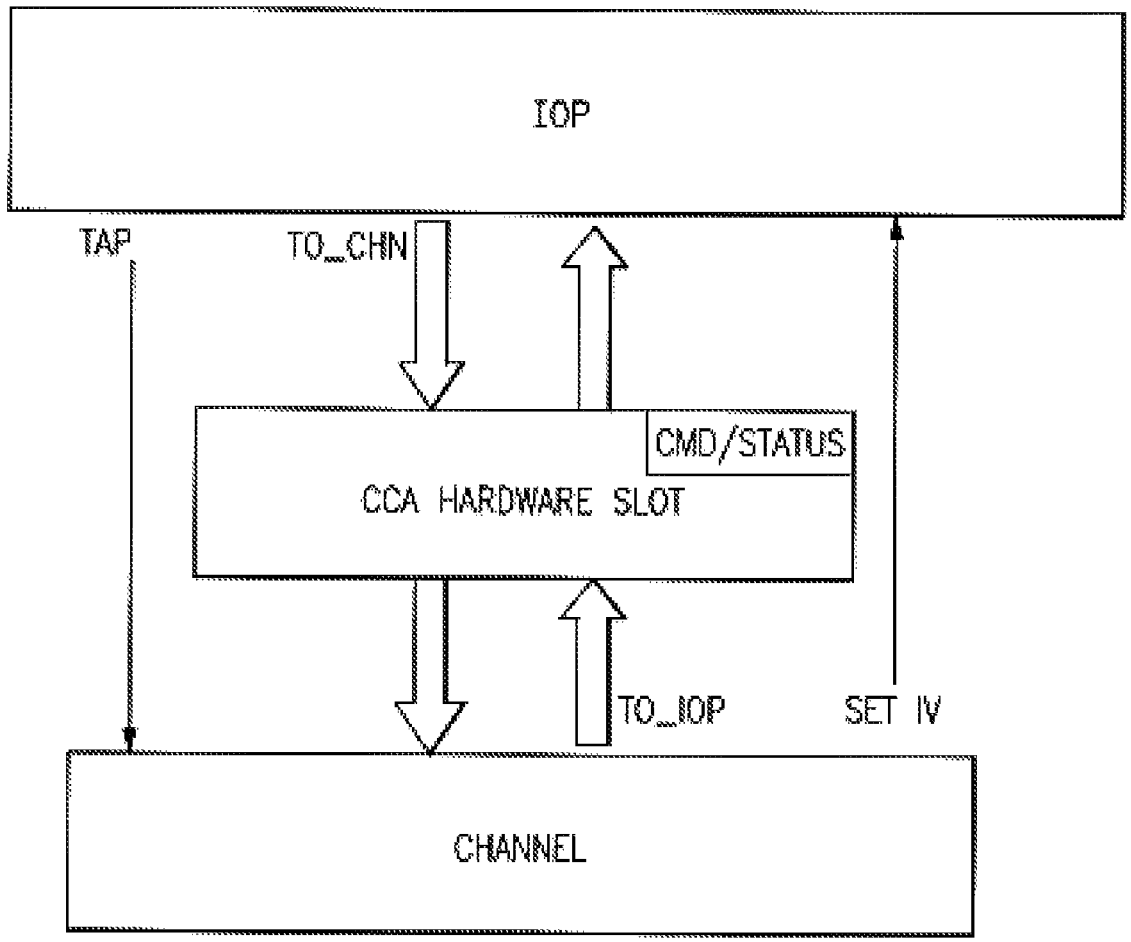
FIG. 1 illustrates a prior art hardware CCA.

With reference to FIG. 1, there is shown a prior art CCA, a hardware array, one per channel. A way to communicate between the Central Electronic Complex (the machine itself) and the channel is the CCA. The CCAs provided a method to signal the channel to go look for new work, to do work, or for the channel to say it had completed work. Information is passed through the CCA, an 8 byte slot, for each channel. The IOP, when writing to one specific channel, supplies a hardware address of the CCA slot and data. The CCA hardware slot is a slot in an array of slots. The hardware and millicode would write the data into the slot and the IOP writes the CCA and taps the channel, identifying to the CCA the specific channel mapped. Typically, a CCA is dedicated to the specific channel and when a channel is plugged into a specific slot in a machine it is connected to a specific CCA. In most systems there can be one to sixteen IOPs but there could be a thousand channels.

There's a command byte (see FIG. 1 CMD STATUS) indicating a command from the IOP down to the Channel, which, when the command is completed, also stores the channel status response from the Channel indicating the status of the operation (command). The channel may also present an unsolicited status of other operations (other devices). There is an addressing scheme of devices reachable through the CCA, and every device on the system has a subchannel associated with it (mapped to it), which itself represents the device logically. Controls are kept for each device because as status comes in it has to be recorded in the correct subchannel.

IOPs are also referred to, synonymously, as SAPs or system assist processors if initialized as a SAP instead of as a CP (central processor). The SAP can be divided up into different levels of code, there's IOP code that takes care of architectural instructions and millicode which deals with unique hardware specific code. The CCA slot has a processor on it and, depending on the type of channel it contains, governs the type of processor it has, e.g. it could have optics because optics could be plugged into the channel if it's a FICON channel, for example. The channel is typically implemented as a card plugged into the slot. An ESCON card can have 16 channels, but each of those channels would map to one CCA slot. In the prior art example shown in FIG. 1, there is one 8 byte CCA slot for each channel. However, as described herein, the IOP and the Channel can function equally well with other media coupling them.

Figure 2:
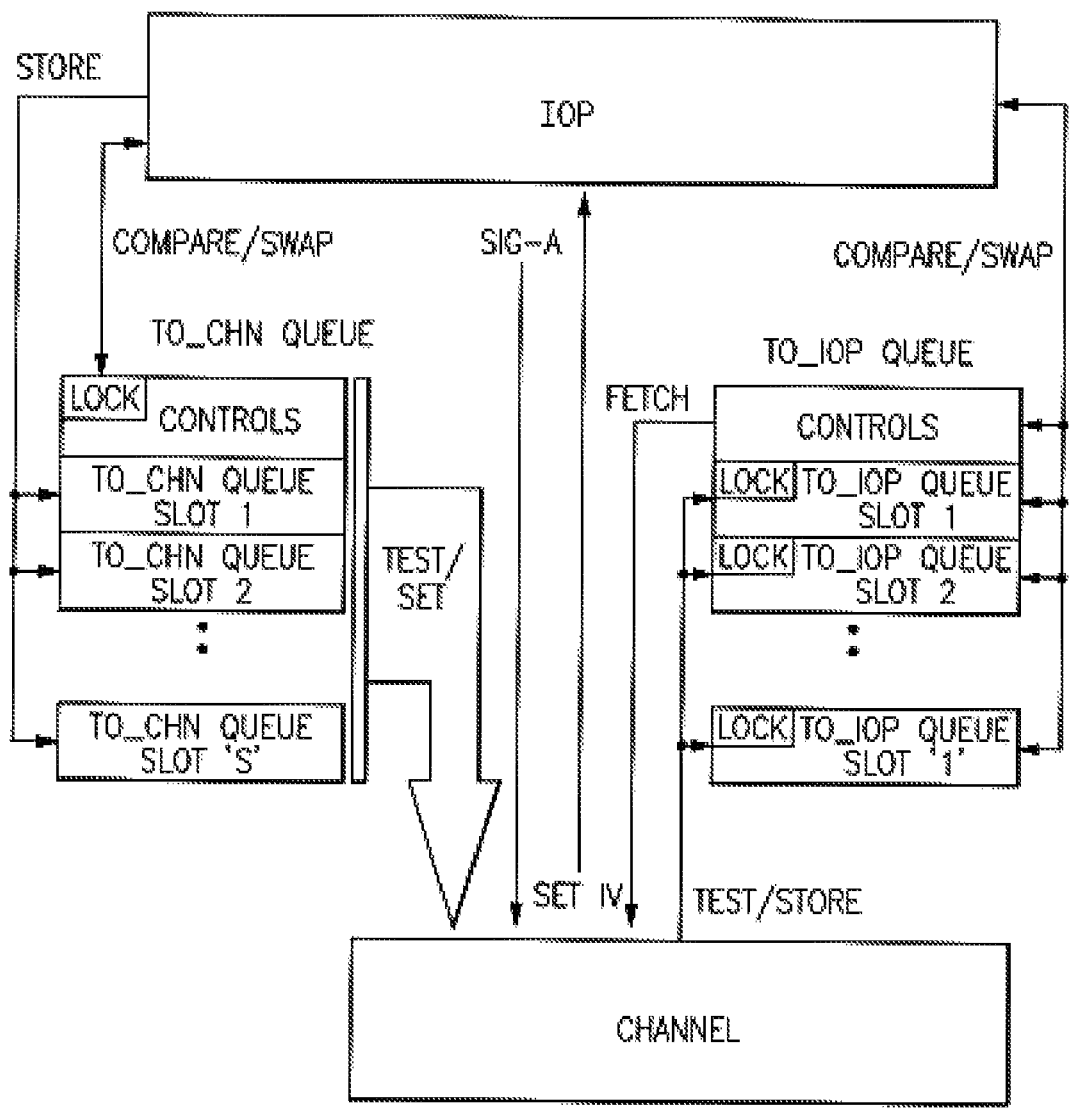
FIG. 2 illustrates the current version of CCA Queues in HSA.

FIG. 2 illustrates the present invention CCA Queues that are bidirectional and full duplex structured in HSA. The CCA "tap line" (SigA signal) and "set interrupt vector" are present. The SIG_A helps the channel differentiate between data coming in the hardware CCA versus the queue—if it sees a SIG_A signal it knows to go to the queue and if it sees a TAP it may go to the CCA hardware slot. Thus, the CCA hardware slot as still present, but it doesn't have to be used as often. It should be included because when cards are plugged in, it's unknown what specific slot is going to be a FICON or ESCON, so the CCA can be designed into part of the board. The queue slots in FIG. 2 can be considered as multiple instances of the CCA slot of FIG. 1.

In the prior art hardware CCA, there were "busy" situations more often. Presently, there are many more slots, which can be designed to include as many as needed. We chose to make it as big as can fit in the maximum store or fetch that the system can provide. For example, a FICON can write 128 bytes at a time into HSA (as can the IOP) in one storage operation. Hence, fourteen or more slots might be selected as a reasonable number.

Since the queues in FIG. 2, are in HSA, the access times to memory are faster compared to the access times of the hardware CCA.

One of the advantages of the present invention is that if an IOP finds that a path is not busy, but the path has affinity to another IOP, it can put the work on that other IOP's CCA queue directly, since it is accessible in the HSA. This is referred to as multiple SAP access to CCA queues. Thus, multiple SAPs are able to access a single channel's CCA queue. That resolves a lot of problems, such as avoiding the channel changing state (i.e. becoming busy) while sending data to the IOP having affinity for a particular channel.

When the Cannel processes the queue it fetches the entire queue. It goes to all the slots because there is no penalty for fetching all, say, 256 bytes, or 8 bytes, for example, during a storage access. Moreover, there is only one lock to maintain. The lock works with the concept of empty/not-empty. When the queue is empty, the lock is ff. When the channel reads the queue, it performs a "test and set". It tests for 0 first. If the value is 0, the fetch occurs, then the value is stored and replaced atomically. The lock would go from 0 to ff when test and set is complete. While the IOP has direct access to HSA, the channel has to go through hardware to connect to it and so needs to issue certain commands. The channel can't work with a queue directly in HSA. Rather, it must issue storage commands—store and fetch. On the other hand, IOP has direct addressability to HSA, similar to a memory access.

Normally, when the IOP is writing into the queue, it attaches its own ID. Thus, different IOPs can write into the same queue. It's going to write the queue and lock it with an IOP #1 lock, or IOP #2 lock, etc. When the channel performs a "test and set", because its not 0, it will receive a "busy" signal and nothing will happen. When the IOP writes, it attempts to lock the queue, and if it detects an FF, it knows that the channel read the previous data, and now the IOP must reset the entire queue. When the IOP writes the queue, the microcode controls tell it where to write into the next open slot.

For FICON, hardware CCA usage could possibly be 10 to 40 times the rate as it is for an ESCON channel, thereby becoming a bottleneck. To alleviate this constraint, the present invention uses all CCA commands after the "Start I/O Request, LCI Complete" (05 TO_CHN) CCA Command to be done via the CCA Queues in HSA. Each FICON channel will have a TO_CHN and TO_IOP CCA queue area in system memory. The CCA Queues, like the hardware CCA, will have affinity to only a single IOP.

CCA queues are used to improve the SSCH path selection algorithms since it makes it easier to enable other IOP that do not have affinity to the channel to write the TO_CHN queue. We plan to exploit having IOPs that do not have a current affinity to a particular channel to write SSCHs TO_CHN commands to that channel. Stop Channel commands can also be written to a channel by IOPs not having affinity to that channel. All other TO_CHN commands are written on the TO_CHN queue via the IOP with affinity to the channel. All CCA interrupts for the TO_IOP queue are handled by the IOP that has affinity to the channel regardless of which IOP may have written the TO_CHN command.

TO_CHN Queue Operations

IOP Protocol

To write a new TO_CHN CCA, the IOP uses a Compare and Swap instruction to lock the TO_CHN Queue so the control block can be updated. If the IOP gets the queue lock, it writes the new CCA in the next available slot in the TO_CHN Queue. The expression, "get the lock" means that the locker has successfully stored the desired lock value in the desired lock field if the current lock value (or compare value) at the time of the lock attempt was the compare value outlined in Table 1 for the TO_CHN Queue Lock. In this case, the IOP would get the queue lock with an IOP Primary lock if the compare lock value was 0000 or FF00. If all slots are full, the IOP then treats this condition as a "CCA Busy". The IOP then frees the TO_CHN queue lock by storing 0000 back into the lock bytes. When the IOP is able to get the lock, the channel still has initiative to fetch the TO_CHN queue. The IOP does not have to signal the channel when the channel still has initiative to fetch the queue. Additional SIG-A is not required, but may be issued for certain cases, described below. If the compare and swap fails because the lock byte is FF00, it means the channel has fetched the TO_CHN queue and the TO_CHN queue is now empty.

The channel never stores into the CCA Control Block, therefore, all of the old CCAs will still be in the control block, but a FF00 in the lock byte means the channel has fetched the queue. The IOP will lock the queue to itself with an IOP Primary Lock using compare and swap with a compare value of FF00. If the IOP gets the lock this time it will write the new CCA in the first position in the TO_CHN queue, zero out the rest of the queue, free the lock and SIG-A the channel to fetch the TO_CHN queue.

Channel Protocol

When the channel detects the SIG-A, it will fetch the TO_CHN queue with a Test and Set command with a lock byte of FF. If the channel gets the lock it will start or queue in the channel all TO_CHN CCAs it fetched from the TO_CHN queue. By the time the channel fetches its CCA area, the IOP may have written more starts into the TO_CHN area for that channel. If the channel did not get the lock, it reissues the Test and Set until it gets the lock. The channel will do other work while trying to fetch the TO_CHN queue. If the TO_CHN queue is empty, the channel will treat this as "over-initiative". "Over-initiative" is a method whereby an element issues a signal to do a task and when the receiver of the signal finds no work to do, it just resets the signal rather than treating it as an error. In this case it means that the IOP may have issued additional SIG-As in the event that it perceives the channel may have not received a prior SIG-A. One case when the IOP may issue additional SIG-As is if it finds the TO_CHN queue full which the IOP treats as a "CCA Busy". The thinking here is that if the queue got full, one possibility is the SIG-A got lost due to a hardware glitch, thus, a retry of the SIG-A is a reasonable action by the IOP. Another possibility is the SIG-A did not get lost, but rather the channel may have been bogged down with other work thereby slowing down servicing the TO_CHN queue. In the latter case, there may be a window where by the channel fetched all the queue entries as the result of the first SIG-A and then it sees as second SIG-A with nothing on the queue. This second SIG-A is thus an "over-initiative" signal and the channel can just reset the SIG-A without raising an error condition.

The channel should take care when resetting the SIG-A to prevent loss of initiative. One method to avoid loss of initiative is for the channel to Reset the SIG-A first and then go service the TO_CHN queue. If the IOP has it locked, the channel can either reissue the Test and Set as mentioned above, or provide internal initiative to get back to servicing the queue at some later time. "Internal initiative" could be a simple as setting some bits that are accessible to the channel that indicate a SIG-A has been received and that the channel should go back, when convenient, to service the queue. Attempting to reset the SIG-A after accessing the queue could open a window where initiative could get lost since the IOP could write new CCAs on the queue in the interval between the channel draining the queue and resetting the SIG-A.

TABLE 1

TO_CHN Lock definitions
(located in Word 1 of the TO_CHN queue)

| Lock Value Bytes (Hex) | | Explanation |
|---|---|---|
| 0 | 1 | |
| FF | 00 | Queue Unlocked, and all messages on it were fetched by the channel: The channel has fetched all entries on this TO_CHN queue and the IOP will need to reset the queue when the IOP attempts to put messages on the queue. The channel will use a compare value of 00 or 70 for Byte 0 of the lock in the Test and Set. When the IOP detects this Lock when it attempts to the lock the queue, it will Reset the queue before inserting new CCA Messages in the first slot. |
| 00 | 00 | Queue Unlocked, but contains unprocessed TO_CHN Messages: The IOP has written messages to the TO_CHN queue, but the channel has not processed them yet. The IOP will set this value into the lock only after it has locked the queue with an IOP Primary Lock. The channel will be able to fetch these messages with a Test and Set with a lock byte of FF (or 70) or an IOP can write more CCAs onto the queue by using a compare and swap to lock it with its IOP Primary lock. |
| 70 | 00 | Intermediate Channel lock: The channel has the option to partially fetch entries from the queue using this lock if it is unable to fetch the entire queue contents in one Test and Set. The channel will use a compare lock value of 00 to set this lock value with Test and Set. Once locked with this value, the channel can fetch as many entries on the queue at a time. After fetching the last entry, the channel should change the lock to FF to indicate it has drained the queue. |
| 40 | ii | IOP Primary Lock: The IOP identified by 'ii' has this TO_CHN queue locked so that it can add more TO_CHN Messages to it. The IOP will use a compare value of 00 or FF for Byte 0 of the lock to set this lock value when issuing the Compare and Swap. |

Fields ii: IOP Number. In a system that can have multiple IOPs, this is the unique number assigned to each IOP.

TO_IOP Queue Operations: I/O INTERRUPTS

The TEST AND STORE tests byte zero for the presence of zeroes in the starting double-word. If byte zero is not zero, no data will be stored. The results of the TEST AND STORE will be indicated in the hardware generated response code from the storage request. The TEST AND STORE must be from 1 to 16 double words on double word boundaries. For TO_IOP CCA interrupts, system area would be set up so that each channel has multiple Quad Word TO_IOP CCA slots. The channel and IOP would use these slots in a FIFO fashion. Ideally, the TO_IOP Queue should be large enough such that the channel only should run into busy CCA slots when the IOP is doing some type of recovery.

Channel Protocol

The channel is initialized with the address of its TO_IOP CCA interrupt queue area and the number of TO_IOP slots. The channel keeps track of the next TO_IOP CCA slot of the FIFO CCA area where the next CCA is to be written. For each TO_IOP CCA the channel stores with a TEST AND STORE, the channel increments the slot address by one. If the address wraps, the channel starts at the top again. If the Test and Store fails the channel queues the interrupt to be stored latter. Every time the Channel does a Test and Store, the channel will set the same Interrupt Vector bit as it does for the hardware CCA.

IOP Protocol

When the IOP sees that a channel has an interrupt, the IOP will handle the TO_IOP CCA in a FIFO order on a "Read CCA" command and zero out each TO_IOP CCA on a "Read CCA and Reset CCA Busy" response, as these are handled. Initiative will need to be maintained within the IOP to keep going back to the queue in the event there are more TO_IOP CCAs to be handled. Also, controls need to be maintained to know which TO_IOP CCA slot is next to be serviced. The TO_IOP Queue header and the CCACB will be used for these controls.

Proposed Control Block Formats

TABLE 2

TO_CHN CCA Queue

| Word | Byte 0 | Byte 1 | Byte 2 | Byte 3 |
|---|---|---|---|---|
| 0 | TO_CHN Queue Lock | | | 0 |
| 1 | Next TO_CHN Slot | | | |
| 2 | | | | |
| 3 | | | | |
| 4 | TO_CHN CCA Message (Slot 1) | | | |
| 5 | | | | |
| 6 | TO_CHN CCA Extension (Slot 1) | | | |
| 7 | | | | |
| . | | | | |
| . | | | | |
| S*4+4 | TO_CHN CCA Message (Slot 'S') | | | |
| S*4+5 | | | | |
| S*4+6 | TO_CHN CCA Extension (Slot 'S') | | | |
| S*4+7 | | | | |

Fields:

S: The maximum Slot Number being supported by the queue. In this embodiment, this number is selected so the queue size does not exceed the maximum size that can be fetched by the channel with one Test and Set instruction. In other embodiment where queue size exceeds this size, the channel intermediate lock can be used as described in Table 1 to allow for the channel to make partial fetches of the queue.

TO_CHN Queue Lock: Lock field set by the IOPs or Channels as described above and in Table 1.

Next TO_CHN Slot: This field is the slot number of next free TO_CHN CCA slot. This field is used by the IOP to manage adding entries on the queue. As the IOP adds CCA messages to the queue, it will increment this number. When this field reaches 'S', the queue is full and if another Write CCA is requested by an application running on the IOP, the IOP code managing the queue will return a "CCA Busy" to that IOP application. One such application is the IOP code that handles SSCH instructions.

TO_CHN CCA Message: The same TO_CHN messages that were created as described in the Table A can be built here. The present invention enables up to 'S' TO_CHN messages, not just one.

TO_CHN CCA Extension: This embodiment enlarges the TO_CHN CCA Message space by an additional 8 bytes although it is not currently used. Other embodiments can make the size of this area as large as needed. In the prior art, the TO_CHN CCA Message was limited by hardware to 8 bytes.

TABLE 3

TO_IOP CCA Queue

| Word | Byte 0 | Byte 1 | Byte 2 | Byte 3 |
|---|---|---|---|---|
| 0 | | | | |
| 1 | Next TO_IOP Slot | | | |
| 2 | | | | |
| 3 | | | | |
| 4 | D | TO_IOP CCA Message (Slot 1) | | |
| 5 | | | | |
| 6 | Extension CTL | TO_IOP CCA Extension (Slot 1) | | |
| 7 | | | | |
| . | | | | |
| . | | | | |
| . | | | | |
| i * 4 + 4 | D | TO_IOP CCA Message (Slot 'i') | | |
| i * 4 + 5 | | | | |
| i * 4 + 6 | Extension CTL | TO_IOP CCA Extension (Slot 'i') | | |
| i * 4 + 7 | | | | |

Fields:

i: The maximum Slot Number being supported by the queue. This size of the queue is not limited by the fetch line size since each queue slot is managed individually.

Next TO_IOP Slot: This field is the slot number of the next valid TO_IOP CCA slot that the IOP will process and it will be incremented after the CCA slot is reset. After processing the 'i' Slot, this value is set back to 1. The Channel may also reference this field to determine if it can write more than one TO_IOP response on the queue.

TO_IOP CCA Message: The same TO_IOP messages that were created as described in the Table A can be built here. The present invention enables up to 'i' TO_IOP messages that the channel can write, not just one.

D: Direction Bit: This bit is set to 1 when the channel builds the TO_IOP CCA Message as done in the prior art to indicate a direction "to the IOP". However, this bit takes on new meaning in the TO_IOP queue serving to indicate that the channel has written a message in the corresponding Slot. When the IOP completes processing the CCA message in this slot, it will zero out the slot and this bit. When the channel does as subsequent Test and Store with a compare value of 0 to store a new TO_IOP CCA Message, the instruction will store the message only if the IOP had reset the byte with the D bit on.

TO_IOP CCA Extension: This embodiment enlarges the TO_IOP CCA Message space by an additional 8 bytes although and can be used for various reasons, e.g. serialization issues for certain architectures. Other embodiments can make the size of this area as large as needed. In the prior art, the TO_CHN CCA Message was limited by hardware to 8 bytes.

Extension CTL: Used to indicate if the TO_IOP CCA Extension is used and for what purposes. Refer to Table 4.

CCA Extension Details for the TO_IOP Queue

The CCA extension can be used for various applications depending on the system messaging requirements.

The TO IOP area in the IOP's private local storage area will need to be expanded to hold the CCA Extension data and/or indicator that the CCA is in response to a HSCH or CSCH.

The E2 device driver will store the full 2 Double Word TO_IOP CCA Slot (and CCA Extension) for all TO_IOP CCA commands. This will free up the E2 device driver from having to know the details of the CCA Extension (i.e. which commands have the extension, etc. . . . ). It will be up to the IOP code to determine the CCA Extension validity.

Byte 0 of the CCA Extension in HSA is the Extension CTLS and is bit significant. It will be set by the channel as described in the following Table:

TABLE 4

| Bit | Extension CTL bits when ON: |
|---|---|
| 0 | CCA command is a Response to a Halt or Clear |
| 1-4 | reserved <0> |
| 5 | Extension Data present |
| 6-7 | reserved <0> |

Response to Halt Subchannel or Clear Subchannel Instruction

Halt Subchannel (HSCH) and Clear Subchannel (CSCH) are two I/O instructions that can be issued by a program to terminate a previous SSCH that was issued or used by the program. With TO_IOP CCA Queues, the channel can now write CCA responses to IOP initiated commands without having to "Overlay" previous TO_IOP commands sitting in the CCA that have not yet been processed by the IOP. However, additional controls are now needed to identify what the TO_IOP commands are in response to. For example, if a SSCH was issued by the IOP followed by a HSCH, when the IOP went to process an SCB Work Pending sitting on the TO_IOP queue, the IOP would not be able to tell if the SCB Work Pending was in response to the SSCH or HSCH. Before CCA queues, the channel would have overlaid this SCB Work Pending for the SSCH with the Overlay bit on in the CCA if it had status from the HSCH to present and the IOP had not yet processed the TO_IOP CCA for the SSCH. In that way, the IOP would know that CCA was also for the HSCH. In this design, the channel will turn on Bit 0 of the Extension CTLS for any TO_IOP CCA command that is in response to a HSCH or CSCH.

Extension Data

The TO_IOP CCA commands which were defined to contain 'CPCB CCA Extension' needed to be re-designed to take advantage of the increased size of the CCA. Words 2 and 3 of the CCA may now contain Extension Data. If Extension CTL bit 5 is 1, then Extension Data is present in the CCA. The chart below defines which CCA command will now contain Extension Data. For commands whose extension data does not fit in the new TO_IOP CCA Extension slot, the CPCB will be used, as is today, to store the CCA Extension data. Thus, the IOP will either have to know the size ahead of time, or just test the lock byte in the CCA extension data.

TABLE 5

| CCA Cmd (hex) | CCA Command | mODIFIER (HEX) | mODIFIER |
|---|---|---|---|
| 0x01 | Link Ctrl LA Valid | 0x11 | Link Reject |
| | | 0x19 | Port Reject |
| | | 0x29 | Port Busy |
| | | 0x31 | ELS Error |
| 0x03 | Link Ctrl CUH Valid | 0x11 | Link Reject |
| | | 0x19 | Port Reject |
| | | 0x29 | Port Busy |
| | | 0x31 | ELS Error |
| 0x56 | PCI Reset Complete | 0x00 | Link Established |
| | | 0x09 | Invalid RSA Attach |

| CCA CMD (HEX) | CCA COMMAND | EVENT TYPE | EVENT DATA |
|---|---|---|---|
| 0x32 | Channel Event Report | Link State change 0x02 | Link Operational 0x0100 |
| | | Link State change Extended 0x08 | Invalid RSA Attach 0x0400 |

Other Control Block Fields

There is one CCACB per channel. Thus, the fields in the control blocks that control the CCA queues for each channel can be different. Thus, this gives the flexibility to have various queue sizes for different channels.

affinity to the channel will be allowed to access the CCA queue. Otherwise, an error condition will be raised.

TO_CHN Queue Length: Size of the TO_CHN queue in double words.

TABLE 6

CCACB - Words 2-7:

| Word | Byte 0 | Byte 1 | Byte 2 | Byte 3 |
|---|---|---|---|---|
| 2 | | | Q Y | |
| 3 | TO_CHN Queue Length (in DWs) | Highest TO_CHN slot# | Highest TO_IOP slot# | |
| 4 | | | TO_CHN CCA Queue Pointer | |
| 5 | | | | |
| 6 | | | TO_IOP CCA Queue Pointer | |
| 7 | | | | |

Fields:

Q: Use CCA Queue. When 1, CCA Queues in HSA is enabled and in use by mainline code for this channel. Set to 1 by IOP code prior to sending "Start I/O Request, LCI Complete" (05 TO_CHN) CCA Command since this bit may be interrogated by the channel as well. ("Start I/O Requests" is sent to channel in Hardware CCA via the PL.8 Adlib override parameter.) All CCACB and CCA Queue fields must be set up first before turning this bit ON. Set to 0 as one of the first steps (to keep other IOPs from accessing the CCA Queue) prior to LRCI, Configure On, T2 recovery, Image Reset and possibly also Dynamic I/O.

Y: Recovery-in-Progress Indicator. Set to 1 when a channel related error is detected by the E2 device driver code. No lock control will be used when this field is set. This requires that ALL UPDATES to the CCACB be done in place in HSA and that this bit be alone in the same byte as the Q bit and that they be updated together. Will be reset when the Q bit is set. When set to 1, the CCA Queue accesses will be limited as follows:

CCA accesses by mainline code will be inhibited and the mainline code will see a "CCA Busy" response for Conditional Write CCA. Channel Type 2 will be invoked with IOP Hard for Unconditional Write CCAs.

CCA accesses during recovery will be allowed to proceed. However, only recovery routines running on the IOP with Highest TO_CHN slot#: This is the "S" value which is the highest slot number in the TO_CHN CCA Queue.

Highest TO_IOP slot#: This is the 'I' value which is the highest slot number in the TO_IOP CCA Queue.

TO_CHN CCA queue pointer: 64 bit address of TO_CHN CCA queue that is located in HSA.

TO_IOP CCA queue pointer: 64 bit address of TO_IOP CCA queue.

All fields in CCACB are for IOP use. The Channel is only using the pointers to the TO_CHN and TO_IOP CCA Queue (Words 4-7) and may be referencing the Next TO_IOP slot#. The channel should also use the Highest TO_CHN and TO_IOP slot# fields, if possible.

CCA Command additional details for the IOP

Conditional Write CCA and Tap Channel

A "CCA Busy" will be returned to the caller (IOP code) of this function if the TO_CHN queue is full (no available slots) or other conditions such as Recovery In Progress made the queue unavailable. (Note: For a Channel writing the TO_IOP queue, they would get a "CCA Busy" if the TO_IOP Queue was full). The "Tap" (SIG-A) would be issued by the code managing the CCA queue only if it encountered a TO_CHN Queue Lock of FF00 even though the caller requested a Tap.

Read CCA

A TO_IOP CCA queue entry will be read in FIFO order based on controls maintained by the IOP. The "Next TO_IOP slot#" in the TO_IOP Queue header will NOT be incremented for this command.

Read CCA and Reset CCA Busy

In addition to reading the TO_IOP CCA queue entry slot, the CCA queue entry slot will be zeroed out thereby freeing it up for the channel to write into it. The "Next TO_IOP slot#" in the TO_IOP Queue header will be incremented for this command.

Read CCA and Reset Interrupt Vector (IV)

In addition to reading the "current" TO_IOP CCA queue entry slot, the IV bit will be reset only if the "next" TO_IOP CCA queue entry slot is also empty since the IV bit now serves as a summary bit of pending TO_IOP commands. After resetting the IV, the IOP code will again check the "next" CCA queue slot to see if that slot now has a CCA queued. If it contains a new TO_IOP CCA, the IOP will turn IV initiative back on. This situation could occur since the channel writes the CCA and then sets the IV. In this window, the IOP could reset the IV bit for the "current" CCA before handling the "next" CCA from the channel thereby loosing initiative. The "Next TO_IOP slot#" in the TO_IOP Queue header will NOT be incremented for this command.

Empty TO_IOP Slot Handling on Reads

If the "current" CCA slot is still empty, the IOP will check the remaining TO_IOP CCA slots for CCAs. If the remaining slots are also empty, the CCA IV will be reset and this will be considered "over initiative". However, if the "current" slot is empty, but one or more remaining "next" slots are not, this will be treated as an error, since things got out of sequence.

IV Over Initiative

Can occur to restore CCA TO_IOP and/or TO_CHN initiative out of recovery.

Unconditional Write CCA

This CCA operation is used in the prior art to overlay a TO_IOP command being processed with a TO_CHN command atomically without having to reset the CCA. With the present invention, when the CCA queue E2 device driver receives a request to perform this operation, it will need to perform the following:
1. Check if the Use CCA Queue (Q) bit is ON in the CCACB. If OFF, then use hardware CCA as done today and skip this procedure. Otherwise, proceed. (This step is done for any CCA write)
2. If the Recovery-in-Progress is ON, then invoke Channel Type 2 with IOP Hard as a way to get out of this state. Another IOP probably detected an error and requested the channel be put through recovery. (This step is done for any CCA Queue write)
3. For Unconditional Write CCA Requests:
    a. If the request is to write the CCA to a Channel without affinity to the IOP using the CCA Queue, this is an Error condition since the TO_IOP CCA Queue slot will need to be reset. TO_IOP processing can only be done in the current design by the IOP with affinity to the channel.
    b. If the TO_CHN CCA queue is FULL, the E2 device driver should go into a lock/unlock vdelay loop waiting for the channel to drain the TO_CHN queue (Lock set to FF00 by the channel means the channel read all the CCA entries). If a timeout occurs, Channel Recovery (and IOP hard) should be invoked. How much time to wait is TBD. (Perhaps the IOP task timer used with special bit in CCA queue to indicate CCA write is waiting on busy? Treat like a control block lock timeout?)
    c. If at least one TO_CHN CCA slot is free, the TO_CHN queue can be written in the same manor as for a Conditional Write CCA with the TO_CHN Queue locked.
    d. Prior to unlocking the TO_CHN CCA queue, the E2 device driver will use the "Next TO_IOP slot#" in the TO_IOP CCA Queue to point to the TO_IOP Slot to be reset. It will then reset this TO_IOP slot and adjust the "Next TO_IOP slot#" as is done for a "Read and Reset CCA" operation. If this slot is already reset, this will be treated as an Error Condition.

Multiple IOP Access to the TO_CHN CCA Queue Issues

The following features provide serialization of the CCA controls in the CCACB and in the CCA queues and also allow for multi-IOP access to the TO_CHN CCA Queues. At the same time, it attempts to eliminate locking other control blocks, such as the CCACB.

When the IOP is processing instructions such as a SSCH and needs to write a CCA message on the TO_CHN CCA Queue, the E2 Device Driver should perform the following:
1. Check if the Use CCA Queue (Q) bit is ON in the CCACB. If OFF, then use hardware CCA as done today and skip this procedure. Otherwise, proceed. (This step is done for any CCA Write)
2. Check if the Recovery-in-Progress (Y) bit is ON in the CCACB:
    For Conditional Write CCAs, if Recovery-in-Progress is ON, then return "CCA Busy" to caller.
    For Unconditional Write CCAs, if the Recovery-in-Progress is ON, Channel Type 2 with IOP Hard should be invoked as a way to get out of this state. See Section "Unconditional Write"
3. Otherwise proceed to update the TO_CHN CCA queue with new TO_CHN request by locking the TO_CHN Queue, making the Update and then Unlocking the queue.

To maintain serialization in the CCA controls in both the CCA queue and the CCACB and to not introduce unnecessary locking in mainline code, the following is proposed when updating the CCACB fields:
1. The "Recovery-in-Progress (Y)" bit in the CCACB can be updated by any IOP without locking the CCACB provided this control block is updated in place in HSA and this bit is in the same byte alone with the Q bit. (Both bits must be set together to avoid C/S). See Table 6: CCACB—Words 2-7
2. All other updates to other CCACB fields can only be made directly in place in HSA and only by the IOP with affinity to the associated channel.

For reading CCACB data without needing to write the TO_CHN CCA queue, it is not necessary to lock the CCACB.

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

The invention claimed is:

1. An apparatus comprising a channel subsystem coupled to a central processing complex and a plurality of communication channels, the central processing complex comprising an I/O processor and a host system memory area located therewith, the apparatus comprising:

at least one input queue and at least one output queue each for holding data sent by one of the central processing complex and communication channel destined for the other one of the central processing complex and communication channel, the at least one input queue and the at least one output queue maintained in the host system memory area, the at least one input queue comprising a plurality of slots for holding data from the communication channel destined for the I/O processor, the plurality of slots being configured in FIFO order for processing by the I/O processor, at least one of the slots includes a lock to be set by the communication channel to indicate whether data is present for processing by the I/O processor, the at least one input queue having a queue header for indicating which slots are to be processed and unlocked by the I/O processor;

the I/O processor configured to write to the at least one output queue at the same time that the communication channel writes to the at least one input queue, and the I/O processor is configured to read from the at least one input queue at the same time that the communication channel reads from the at least one output queue; and the communication channel configured to determine which of the slots that the communication channel can write or if the at least one input queue is full, and alert the I/O processor whether the at least one input queue has data to be processed by the I/O processor.

2. A program storage device readable by machine, tangibly embodying a program of instructions executable by the machine to perform method steps for handling communications between a central processing complex and a plurality of communication channels, the central processing complex comprising an I/O processor, a host system memory area located therewith, and at least one input queue and at least one output queue each for holding data sent by one of the central processing complex and communication channel destined for the other one of the central processing complex and communication channel, said method steps comprising:

maintaining the at least one input queue and the at least one output queue in the host system memory area, the at least one input queue comprising a plurality of slots for holding data from the communication channel destined for the I/O processor, the plurality of slots being configured in FIFO order for processing by the I/O processor, at least one of the slots includes a lock to be set by the communication channel to indicate whether data is present for processing by the I/O processor, the at least one input queue having a queue header for indicating which slots are to be processed and unlocked by the I/O processor;

the I/O processor writing to the at least one output queue at the same time that the communication channel writes to the at least one input queue, and the I/O processor is capable of reading from the at least one input queue at the same time that the communication channel reads from the at least one output queue; and the communication channel determining which of the slots that the communication channel can write or if the at least one input queue is full, and alerting the I/O processor whether the at least one input queue has data to be processed by the I/O processor.

* * * * *